United States Patent [19]

Cleary

[11] Patent Number: 4,880,901

[45] Date of Patent: Nov. 14, 1989

[54] ARYLENE SULFIDE TERPOLYMERS AND PROCESSES FOR MAKING THEM

[75] Inventor: James W. Cleary, Bartlesville, Okla.

[73] Assignee: Phillips Petroleum Company, Bartlesville, Okla.

[21] Appl. No.: 870,652

[22] Filed: May 30, 1986

Related U.S. Application Data

[63] Continuation of Ser. No. 786,901, Oct. 11, 1985, abandoned, which is a continuation of Ser. No. 404,683, Aug. 3, 1982, abandoned.

[51] Int. Cl.$^4$ ............................................. C08G 75/14
[52] U.S. Cl. .............................. 528/388; 264/331.14; 264/331.11
[58] Field of Search ................... 528/388; 264/331.11, 264/331.14

[56] References Cited

U.S. PATENT DOCUMENTS

| | | | |
|---|---|---|---|
| 3,869,434 | 3/1975 | Campbell et al. | 528/388 |
| 3,988,286 | 10/1976 | Edmonds, Jr. et al. | 528/388 |
| 4,038,261 | 7/1977 | Crouch et al. | 528/388 |
| 4,038,262 | 7/1977 | Edmonds, Jr. | 528/388 |
| 4,064,114 | 12/1977 | Edmonds, Jr. | 528/388 |
| 4,116,947 | 9/1978 | Edmonds, Jr. et al. | 528/388 |
| 4,303,781 | 12/1981 | Idel et al. | 528/388 |
| 4,331,801 | 5/1982 | Idel et al. | 528/388 |
| 4,362,864 | 12/1982 | Idel et al. | 528/388 |

*Primary Examiner*—Melvyn I. Marquis
*Attorney, Agent, or Firm*—Williams, Phillips & Umphlett

[57] ABSTRACT

A process for the production of an arylene sulfide terpolymer is provided comprising reacting at least one alkali metal sulfide, at least one p-dihalo unsubstituted benzene, at least one polyhalo aromatic compound having more than two halogen substituents per molecule, at least one p-dihalo alkyl substituted benzene, and at least one N-alkyl lactam. Another process is provided comprising first reacting an at least one alkali metal sulfide in hydrated form or in an aqueous mixture with at least one N-alkyl lactam to form a reaction product, thereafter heating the reaction product to form a dehydrated composition, then reacting the dehydrated composition with a mixture consisting essentially of at least one p-dihalo unsubstituted benzene, at least one polyhalo aromatic compound having more than 2 halogen atoms per molecule, at least one p-dihalo alkyl subsituted benzene, and at least one member selected from the group consisting of (a) water in an amount of about 0.2 mole to about 2.5 moles per molecule of alkali metal sulfide, and (b) at least one sodium carboxylate and water, including water of hydration, in an amount of 0.0 mole to about 2.5 moles per mole of alkali metal sulfide under polymerization condiitions for a time sufficient to produce the desired terpolymer. Arylene sulfide terpolymers are provided as products of the above processes.

17 Claims, No Drawings

ARYLENE SULFIDE TERPOLYMERS AND PROCESSES FOR MAKING THEM

This is a continuation of application Ser. No. 786,901, filed Oct. 11, 1985, now abandoned, which is a continuation of application Ser. No. 404,683, filed Aug. 3, 1982, now abandoned.

This invention relates to arylene sulfide terpolymers and processes for making them.

The production of arylene sulfide polymers is well known in the art as disclosed in U.S. Pat. No. 3,354,129 to Edmonds et al. In addition, arylene sulfide copolymers are also known, as disclosed in U.S. Pat. No. 4,038,261.

I have now discovered that arylene sulfide terpolymers can be made as well. These terpolymers have applications in the formation of articles of manufacture such as films, sheets, fibers, coatings, and molded articles. Substantially amorphous, essentially non-crystalline arylene sulfide terpolymers are paraticularly desirable as they are melt stable and can be procesed at lower temperatures than crystalline poly(arylene sulfide). Such terpolymers can be prepared directly to the range of melt flow desired for injection molding or can be air cured to attain the desired melt flow.

Unexpectedly, I have discovered arylene sulfide terpolymers that are especially non-crystalline (amorphous) and heat stable as they lack both a melting point, $T_m$, and a crystallization temperature, $T_c$, value as determined by the conventional method of Differential Thermal Analysis (DTA). Hence, the terpolymers of this invention are particularly useful in applications such as molding injections. These terpolymers can be filled with glass fibers, pigments, clay, talc, and other substances used in molding injections.

It is an object of this invention to provide novel, arylene sulfide terpolymers. It is a further object of this invention to provide processes for making these terpolymers.

Other objects, aspects, and the several advantages of the present invention will become appaarent from this specification and the claims.

In one embodiment of the present invention, I have discovered a process for making novel arylene sulfide terpolymers by reacting at least one alkali metal sulfide, at least one p-dihalo unsubstituted benzene, at least one polyhalo aromatic compound having more than two halogen substituents per molecule, at least one p-dihalo alkyl substituted benzene, and at least one N-alkyl lactam, under polymerization conditions of temperature and time sufficient to produce the desired terpolymer.

In a second embodiment of the present invention, I have discovered still another process for making novel arylene sulfide terpolymers by first reacting at least one alkali metal sulfide in hydrated form or in an aqueous mixture with at least one N-alkyl lactam to form a reaction product, thereafter heating the reaction product to form a dehydrated composition, then reacting the dehydrated composition with a mixture consisting essentially of at least one p-dihalo unsubstituted benzene, at least one polyhalo aromatic compound having more than two halogen substituents per molecule, at least one p-dihalo alkyl substituted benzene, and at least one member selected from the group consisting of (a) water in an amount of about 0.2 mole to about 2.5 moles per molecule of alkali metal sulfide, and (b) at least one alkali metal carboxylate and water, including water of hydration, in an amount of 0.0 mole to about 2.5 moles per mole of alkali metal sulfide under polymerization conditions for a time sufficient to produce a desired terpolymer.

In a third embodiment of the present invention, novel arylene sulfide terpolymers produced by the processed of the first and second embodiments of the present invention are provided.

P-dihalo unsubstituted benzenes which can be employed in the process of this invention can be represented by the formula

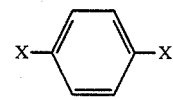

where each X is selected from the group consisting of chlorine, bromine, and iodine.

Examples of some p-dihalo unsubstituted benzenes which can be employed in the process of this invention include p-dichlorobenzene, p-dibromobenzene, p-diiodobenzene, 1-chloro-4-bromobenzene, 1-chloro4-iodobenzene, 1-bromo-4-iodobenzene, and mixtures thereof.

Polyhalo aromatic compounds having more than two halogen substituents per molecule which can be employed in the process of this invention can be represented by the formula $R^1X_n$, where each X is selected from the group consisting of chlorine, bromine, and iodine, n is an integer of 3 to 6, nd $R^1$ is a polyvalelnt aromatic radical of valence n which can have up to about 4 methyl substituents, the total number of carbon atoms in $R^1$ being within the range of 6 to about 16.

Examples of some polyhalo aromatic compounds having more than two halogen substituents per molecule which can be employed in the process of this invention include 1,2,3-trichlorobenzene, 1,2,4-trichlorobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetraiodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and mixtures thereof.

P-dihalp alkyl substituted benzenes which can be employed in the process of this invention can be represented by the formula:

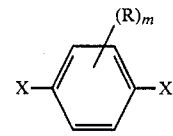

where R is a $C_1$ to $C_{12}$ alkyl group, m is 1, 2, 3, or 4, X is either Cl, Br, or I.

Examples of p-dihalo alkyl substituted benzenes which can be employed in the process of this invention include 2,5-dichlorotoluene, 2,5 dichloro-p-xylene, 2,5-dibromotoluene, 2,5-diiodo-p-xylene, 2,5-dichloro-1,3,6-trimethylbenzene, and mixtures thereof.

Alkali metal sulfides which can be employed in the process of this invention are sodium sulfide, potassium sulfide, rubidium sulfide, cesium sulfide, as well as mixtures thereof. The alkali metal sulfide can be used in the anhydrous form, as a hydrate, or as an aqueous mixture. If desired, the alkali metal sulfide can be produced by reaction of hydrogen sulfide or sodium bisulfide with sodium hydroxide in an aqueous medium.

N-Alkyl lactams which can be employed in the process of this invention can be represented by the formula

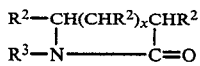

where each $R^2$ is selected from the group consisting of hydrogen and $R^3$, $R^3$ is an alkyl radical having 1 to about 3 carbon atoms, x is an integer of 1 to 3, and the total number of carbon atoms in the N-alkyl lactam is within the range of about 5 to about 10.

Examples of some N-alkyl lactams which can be employed in the process of this invention include N-methyl-2-pyrrolidone, N-ethyl-2-pyrrolidone, N-isopropy-2-pyrrolidone, N,3-dimethyl 2-pyrrolidone, N-Propyl-5-methyl-2-pyrrolidone, N,3,4,5-tetramethyl-2-pyrrolidone, N-isospropyl-4-propyl-2-pyrrolidone, N-methyl-2-piperidone, N,6-diethyl-2-piperidone, N-methyl-5-isopropyl-2-piperidone, N-methyl-3-ethyl-2-piperidone, N-methyl-2-oxohexamethylenimine, N-ethyl-2-oxohexamethylenimine, N-methyl-2-oxo-5-ethylhexamethylenimine, N-propyl-2-oxo-5-methylhexamethylenimine, N-methyl-2-oxo-3-propylhexamethylenimine, N-methyl-2-oxo-7-isopropylhexamethylenimine, and the like, and mixtures thereof.

Alkali metal carboxylates which can be employed in the process of this invention can be represented by the formula $R^4CO_2M$, where $R^4$ is a hydrocarbyl radical selected from alkyl, cycloalkyl, and aryl, and combinations thereof such as alkaaryl, aralkyl, and the like, and the number of carbon atoms in $R^4$ is within the range of 1 to about 20 and M is Li, Na, K, Rb, Cs. If desired, the alkali metal carboxylate can be employed as a hydrate or as a solution or dispersion in water. However, if the total amount of free water and/or water of hydration present, including that associated with the alkali metal sulfide, exceeds the amount specified hereinabove, excess water must be removed, e.g., by distillation, prior to the polymerization step.

Examples of some alkali metal carboxylates which can be employed in the process of this invention include sodium acetate, sodium propionate, sodium 2-methylpropionate, sodium benzoate, sodium butyrate, sodium valaerate, sodium hexanoate, sodium heptanoate, sodium 2-methyloctanozte, sodium dodecanoate, lithium acetate, lithium propionatae, lithium hexanoate, rubidium acetate, rubidium butyrate, rubidium heptanoate, cesium acetate, secium propionate, secium octanoate and mixtures thereof. The preferred alkali metal carboxylate is sodium acetate.

Although the mole ratio of the combination of p-dihalo unsubstituted and substituted benzene to alkali metal sulfide can vary somewhat, generally, it will be within the range of about 0.98:1 to about 1.03:1, preferably within the range of about 0.99:1 to about 1.02:1. The mole ratio of polyhalo aromatic compound having more than two halogen substituents per molecule to alkali metal sulfide can vary considerably, depending in part on the halogen content of said polyhalo aromatic compound and on the water and sodium carboxylate content of the polymerization system, but generally will be within the range of about 0.0002:1 to about 0.014:1, preferably, within the range of abaout 0.001:1 to about 0.012:1. The mole ratio of alkali metal carboxylate, when used, to alkali metal sulfide can vary over a wide range, but generally will be within the range of about 0.05:1 to abou 1.5:1, preferably within the range of about 0.1:1 to about 0.8:1. The mole ratio of N-alkyl lactam to alkali metal suflide can vary considerably, but generally will be within the range of about 2:1 to about 10:1, preferably within the range of abou 3:1 to about 6:1.

Although the reaction temperature at which the polymerization is conducted can vary over a widde range, generally it will be within the range of about 180° C. to about 285° C., preferably within the range of about 190° C. to about 275° C. The reaction time can vary greatly, depending in part on the reaction temperature, but generally will be within the range of about 1 hour to about 60 hours, preferably within the range of about 2 hours to about 10 hours. In a presently preferred procedure, the polymerization is conducted within a first temperature in the range of about 180° C. to about 245° C., preferably at about 190° C. to about 245° C., and then within a second temperature range of about 245° C. to ab out 285° C., preferably about 245° C. to about 275° C., the total reaction time for the polymerization in these two temperature ranges being within the range of about 1 hour to about 60 hours, preferably about 2 hours to about 10 hours, about 15 percent to about 70 percent of which time is within the first temperature range, the temperature during at least 50 percent of the reaction time in the first temperature range being at least 20° C. below the final temperature in the second temperature range. Here, too, the reaction times are dependent, in part, on the reaction temperatures. In either or both of the temperature ranges, the temperature can be incresed continuously or maintined predominantly at selected levels within relatively restricted temperature limits.

The pressure at which the polymerization reaction is conducted should be sufficient to maintain the p-dihalo unsubstituted benzene, the p-dihalo alkyl substituted benzene, the polyhlao aromatic compound having more than two halogen substituents per molecule, the N-alkyl lactam, and the water substantially in the liquid phase.

The process of this invention can be carried out by mixing the p-dihalo unsubstituted benzene, the p-dihalo alkyl substituted benzene, the polyhalo aromatic compound having more than two halogen substituents per molecule, the alkali metal suflide, the N-alkyl lactam, the water, including water of hydration, if used, and the alkali metal carboxylate, if used, in any order. If more than the desired amount of water, in the form of free water and/or water of hydration is present in the mixture or any component of the mixture, any water in excess of the desired amount can be removed, e.g., by distillation. Such excess water can be removed from the component with which water is initially associated, e.g., the alkali metal sulfide or the sodium carboxylate, or from a mixture of two or more of the essential ingredients. For example, water can be removed from a mixture of N-alkyl lactam and hydrated alkali metal sulfide, optionally containing free water and/or alkali metal carboxylate which itself can be employed in anhydrous or hydrated form or as a solution. If the amount of water removed is greater than desired, water can then be added as required to provide the quantity of water desired. When the above dehydration step is employed, it is preferably to add the p-dihalo unsubstituted benzene, the p-dihalo alkyl substituted benzene, and the polyhalo aromatic compound having more than two halogen substituents per molecule after the dehydration step has begun.

The arylene sulfide terpolymer produced by the processes of this invention can be separated from the reaction mixture by conventional procedures, e.g., by filtration of the polymer, followed by washing with water, or by dilution of the reaction mixture with water, followed by filtration and water washing of the polymer. Alternatively, N-alkyl lactam can be recovered by distillation from the reaction mixture prior to washing with water. When this latter procedure is employed, and the N-alkyl lactam is distilled at elevated temperatures, e.g., above 200° C., it is preferable that carbon dioxide be added during the polymerization reaction or upon completion of the polymerization reaction, but prior to distillation of the N-alkyl lactam, to inhibit decomposition of the arylene sulfide terpolymer during distillation of the N-alkyl lactam.

In a preferred embodiment of the present invention amorphous, essentially non-crystalline arylene sulfide terpolymers are produced. They are prepared in the same manner as described above, except that from about 12 to about 30, preferably from about 15 to about 20 mole percent, of the p-dihalo alkyl substituted benzene must specifically be employed.

The following examples illustrate the present invention.

EXAMPLES

Example I

In this example the preparation of the terpolymers of this invention is described. Polymerization reactions were carried out in a 1 liter, electrically heated, stirred autoclave manufactured by Autoclave Engineer, Inc. 125.16 grams (0.98 moles) of sodium sulfide flakes, 24.61 grams (10.30 moles) of anhydrous sodium acetate, 1.2 grams (0.02 moles) of sodium hydroxide and 228 cc of N-methyl-2-pyrrolidone (NMP) were charged to the reactor, and heated, with stirring, under atmospheric pressure until the air in the reactor is replaced by steam. The system was closed, heated under autogenous pressure to about 235° C., cooled to about 162° C., and dehydrated by distillation under atmospheric pressure ata a temperataure of up to about 216° C.

Then 0.9925 moles of either p-dichlorobenzene (DCB) (for a control resin) or 0.9925 moles of a mixture of DCB and either a dichlorotoluene (DCT) or a dichloroxylene (DCX) (for inventive resins), 0.905 grams (0.005 moles) of 1,2,4-trichlorobenzene (TCB), 4.5 grams (0.25 moles) of water, and 92 cc of NMP were added to the reactor. The reactor content was heated under autogenous pressure for 2 hours at 235° C. and for 3 hours at 265° C. The cooled polymer was removed from the reactor, slurried and washed with hot water, collected on a suction filter, rinsed with acetone, and dried in a vacuum oven at about 100° C.

EXAMPLE II

Pertinent properties of four arylene sulfide terpolymers are listed in Table I. Data in Table I show that in terpolymers containing at least 15 mole-% of either 2,5-dichlorotoluene or 2,5-dichloroxylene no crystallization temperature (Tc) and melting temperature (Tm) were detected. These results indicate that said terpolymers were essentially non-crystalline. By contrast, terpolymers containing up to 20 mole-% of either 2,4- or 2,6-dichlorotoluene as comonomers remained crystalline.

TABLE I

| Run | Mole % of Comonomer I | Mole % of Comonomer II | Mole % of Comonomer III | Transition Temperatures[a] (°C.) $T_g$ | $T_c$ | $T_m$ | Inherent[b] Viscosity |
|---|---|---|---|---|---|---|---|
| 1 | 99.5% DCB | — | 0.5% TCB | 85 | 125 | 285 | 0.29 |
| 2 | 94.5% DCB | 5.0% 2,5-DCT | 0.5% TCB | 90 | 164 | 256 | 0.50 |
| 3 | 89.5% DCB | 10.0% 2,5-DCT | 0.5% TCB | 87 | 165 | 240 | — |
| 4 | 84.5% DCB | 15.0% 2,5-DCT | 0.5% TCB | 86 | None | None | 0.25 |
| 5 | 84.0% DCB | 15.0% 2,5-DCT | 1.0% TCB | 88 | None | None | 0.57 |
| 6 | 83.4% DCB | 16.1% 2,5-DCT | 0.5% TCB | 85 | None | None | 0.25 |
| 7 | 79.5% DCB | 20.5% 2,5-DCT | 0.5% TCB | 85 | None | None | 0.20 |
| 8 | 94.5% DCB | 5.0% 2,5-DCX | 0.5% TCB | 87 | 151 | 260 | 0.32 |
| 9 | 89.5% DCB | 10.0% 2,5-DCX | 0.5% TCB | 90 | 182 | 245 | 0.29 |
| 10 | 84.5% DCB | 15.0% 2,5-DCX | 0.5% TCB | 94 | None | None | 0.31 |
| 11 | 84.0% DCB | 15.0% 2,5-DCX | 1.0% TCB | 92 | None | None | 0.37 |
| 12 | 89.5% DCB | 10.0% 2,4-DCT | 0.5% TCB | 61 | 119 | 255 | 0.06 |
| 13 | 84.5% DCB | 15.0% 2,4-DCT | 0.5% TCB | 64 | 131 | 233 | 0.07 |
| 14 | 79.5% DCB | 20.0% 2,4-DCT | 0.5% TCB | 69 | 155 | 215 | 0.06 |
| 15 | 89.5% DCB | 10.0% 2,6-DCT | 0.5% TCB | 74 | 139 | 248 | 0.12 |
| 16 | 84.5% DCB | 15.0% 2,6-DCT | 0.5% TCB | 76 | 170 | 230 | 0.09 |
| 17 | 79.5% DCB | 20.0% 2,6-DCT | 0.5% TCB | 67 | 160 | 220 | 0.08 |

Footnotes:
[a]determined with a Du Pont Model 900 Differential Thermal Analyzer; Tg = glass transition termperature; Tc = crystallization termperature; Tm = melting temperature
[b]determined at 204° C. on solutions containing 0.4 grams of terpolymer per 100 ml of 1-chloronaphthalene.

Reasonable variations and modifications are possible from the disclosure of the present invention without departing from the spirit thereof.

I claim:
1. A process comprising the steps:
   (a) contacting components consisting of at least one alkali metal sulfide, at least one p-dihalo unsubstituted benzene, at least one polyhalo aromatic compound having more than two halogen substituents per molecule, about 15 to aabout 20 mole percent of at least one p-dihalo alkyl substituted benzene, and at least one N-alkyl lactam, under polymerization conditions for a time effective to produce an amorphous arylene sulfide polymer; and
   (b) recovering said amorphous arylene sulfide polymer, wherein said amorphous arylene sulfide polymer has essentially no melting point ($T_m$) and essentially no crystallization temperature ($T_c$).

2. The process of claim 1 in which the alkali metal sulfide is sodium sulfide, the p-dihalo unsubstituted benzene is p-dichlorobenzene, the polyhalo aromatic compound is 1,2,4-trichlorobenzene, the p-dihalo alkyl substituted benzene is selected from the group consisting of 2,5-dichlorotoluene and 2,5-dichloro-p-xylene, and the N-alkyl lactam is N-methyl pyrrolidone.

3. The process of claim 2 in which the mole ratio of the combined aamount of p-dichlorobenzene nnd p-dihalo alkyl substituted benzene to sodium sulfide is about 0.98:1 to about 1.03:1, the mole ratio of the 1,2,4-trichlorobenzene to the sodium sulfide is about 0.0002:1 to abou 0.014:1, and the mole ratio of the N-methyl pyrrolidone to the sodium sulfide is about 2:1 to about 10:1.

4. The process if claim 3 in which the polymerization conditions include a polymerization temperature of about 180° C. to about 285° C. and a pressure effective for maintaining the p-dichlorobenzene, the 1,2,4-trichlorobenzene, any 2,5-dichlorotoluene, any 2,5-dichloro-p-xylene, and the N-methyl pyrrolidone in liquid phase.

5. An amorphous arylene sulfide polymer produced by the method of claim 2.

6. A process comprising the steps:
(a) contacting components consisting of at least one N-alkyl lactam with at least one lakali metal sulfide to form a reaction product wherein said alkali metal sulfide is in a form selected from the group consisting of hydrated alkali metal sulfide and alkali metal sulfide aqueous mixture,
(b) heating said reaction product to form a dehydraated composition,
(c) reacting said dehydrated composition with a mixture consisting of at least one p-dihalo unsubstituted benzene, at least one polyhalo aromatic compound having more than two halogen substituents per molecule, about 15 to about 20 mole percent of at least one p-dihalo alkyl substituted benzene, and at least one member selected from the groups consisting of (1) water in an amount of about 0.2 mole to about 2.5 moles per mole of alkali metal sulfide, and (2) at least one alkali metal carboxylate and water in an amount of 0.0 mole to about 2.5 moles per mole of alkali metal sulfide, under polymerization conditions for a time effective to produce an amorphous arylene sulfide polymer, and
(d) recovering said amorphous arylene sulfide polymer, wherein said amorphous arylene sulfide polymer has essentially no melting point $(T_m)$ and essentially no crystallization temperature $(T_c)$.

7. The process of claim 6 in which the alkali metal sulfide is sodium sulfide, the p-dihalo unsubstituted benzene is p-dichlorobenzene, the polyhalo aromatic compound is 1,2,4-trichlorobenzene, the p-dihalo alkyl substituted benzene is selected from the group consisting of 2,5-dichlorotoluene and 2,5-dichloro-p-xylene, the N-alkyl lactam is N-methyl pyrrolidone, and the alkali metal carboxylate is sodium acetate.

8. The process of claim 7 in which the mole ratio of the combined amount of p-dichlorobenzene nd p-dihalo alkyl substituted benzene to sodium sulfide is about 0.98:1 to about 1.03:1, the mole ratio of the 1,2,4-trichlorobenzene to the sodium sulfide is about 0.0002:1 to about 0.014:1 and the mole ratio of the N-methyl pyrrolidone to the sodium sulfide is about 2:1 to about 10:1.

9. The process of claim 8 in which the polymerization conditions include a polymerization temperature of about 180° C. to about 285° C. and a pressure effective for maintaining the p-dichlorobenzene, the 1,2,4-trichlorobenzene, any 2,5-dichlorotoluene, any 2,5-dichloro-p-xylene, the N-methyl pyrrolidone, and the water in liquid phase.

10. An amorphous arylene suslfide polymer produced by the method of claim 6.

11. A method for producing an amorphous arylene sulfide polymer having essentially no melting point $(Tm)$ and essentially no crystallization temperature $(Tc)$, the method consisting of contacting, under polymerization conditions a component from each of the groups (a) at least one p-dihalo unsubstituted benzene, (b) at least one polyhalo aromatic compound having more than two halogen substituents per molecule, and (c) at least one p-dihalo alkyl substituted benzene, in the presence of an alkali metal sulfide and N-methyl pyrrolidone, the p-dihalo alkyl substituted benzene bein present in an amount of about 15 to about 20 mole percent.

12. The method of claim 11 in which the components contacted under polymerization conditions consist of p-dichlorobenzene, 1,2,4-trichlorobenzene, and 2,5-dichlorotoluene or 2,5-dichloro-p-xylene.

13. The method of claim 11 in which the mole ratio of the combined amount of the p-dihalo unsubstituted and p-dihalo alkyl substituted benzene to alkali metal sulfide is about 0.98:1 to about 1.03:1, the mole ratio of the polyhalo aromatic compound to the alkali metal sulfide is within the range of about 0.0002:1 to about 0.014:1, and the mole ratio of N-methyl pyrrolidone to alkalil metal sulfide is about 2:1 to about 10:1.

14. An article of manufacture prepared from the arylene sulfide polymer made by the process of claim 1.

15. An injection molded article comprising the arylene sulfide polymer made by the process of claim 1.

16. A film produced from the arylene sulfide polymer made by the process of claim 6.

17. A fiber produced from the arylene sulfide polymer made by the process of claim 6.

* * * * *